United States Patent

Sagar

Patent Number: 6,082,409
Date of Patent: Jul. 4, 2000

[54] THAWING TUBE GUIDE FOR A CULVERT

[76] Inventor: Robert Sagar, P.O. Box 876235, Wassilla, Ak. 99687

[21] Appl. No.: 09/028,450

[22] Filed: Feb. 24, 1998

Related U.S. Application Data

[60] Provisional application No. 60/051,840, Jul. 7, 1997.

[51] Int. Cl.[7] .................................................. F16L 53/00
[52] U.S. Cl. ........................... 138/32; 138/35; 138/107; 138/108
[58] Field of Search ................................ 138/32, 33, 35, 138/28, 104, 107, 108

[56] References Cited

U.S. PATENT DOCUMENTS

| | | |
|---|---|---|
| 77,857 | 5/1868 | Young . |
| 193,429 | 10/1877 | Farrell et al. . |
| 678,118 | 7/1901 | Kruschke ................................. 138/32 |
| 716,784 | 12/1902 | Sullivan ................................... 138/35 |
| 794,724 | 7/1905 | Madsen .................................... 138/32 |
| 827,025 | 7/1906 | Liddle . |
| 980,314 | 1/1911 | McGill .................................... 138/32 |
| 1,150,946 | 8/1915 | Kenlon .................................... 138/32 |
| 1,253,692 | 1/1918 | Kampff . |
| 1,292,941 | 1/1919 | Winters ................................... 138/32 |
| 1,294,888 | 2/1919 | Farrell et al. . |
| 2,456,807 | 12/1948 | Yindrock et al. ......................... 138/32 |
| 3,716,076 | 2/1973 | Franzmeier .............................. 138/32 |
| 3,770,022 | 11/1973 | Beisemann ............................. 138/108 |
| 4,565,351 | 1/1986 | Conti et al. ............................ 138/108 |
| 4,770,211 | 9/1988 | Olsson .................................... 138/28 |
| 5,623,971 | 4/1997 | Foernzler ............................... 138/104 |

FOREIGN PATENT DOCUMENTS

| | | |
|---|---|---|
| 682618 | 9/1979 | U.S.S.R. . |
| 1135862 | 1/1985 | U.S.S.R. . |
| 3875 | 2/1914 | United Kingdom . |

*Primary Examiner*—James F. Hook
*Attorney, Agent, or Firm*—Richard C. Litman

[57] ABSTRACT

A thawing tube guide is prepositioned at the opening of a culvert to facilitate maintenance personnel in passing a culvert thawing tube with a power head into a culvert opening which is covered by ice, snow or an ice slurry. The culvert thawing tube guide includes a guide pipe having a discharge end positioned within the culvert and an inlet end positioned in at an easily accessible location. A cap and a reflective material are attached to the inlet end to prevent the accumulation of debris within the tube and to aid in detecting its location respectively.

9 Claims, 3 Drawing Sheets

THAWING TUBE GUIDE FOR A CULVERT

CROSS-REFERENCE TO RELATED APPLICATION

This application claims the benefit of U.S. Provisional Patent Application Ser. No. 60/051,840, filed Jul. 7, 1997.

BACKGROUND OF THE INVENTION

1. Field of the Invention

The present invention generally relates to culvert thawing devices and more specifically to a guide pipe for passing a culvert thawing tube with a power head into a culvert.

2. Description of Related Art

During periods of cold weather, water draining through underground culverts tends to freeze, choking the culvert with ice. This phenomenon is especially prevalent in northern localities. Before warmer weather thaws the ice within the culverts, and reestablishes communication therethrough, the water from the melting snow floods the roadbed and greatly impairs the same by washing gullies therein.

Various methods have been set forth to prevent these and similar disastrous results caused by freezing culverts. Examples of methods and devices generally related to this art include U.S. Pat. No. 77,857 issued May 1868 to Young (Clearing Pipes); U.S. Pat. No. 678,118 issued July 1901 to Kruschke (Heating Attachment for Culverts); U.S. Pat. No. 827,025 issued July 1906 to Liddle (Device for Thawing Frosted Hydrants, Water Mains, and Service Pipes from Mains to House Hydrants); U.S. Pat. No. 980,314 issued January 1911 to McGill (Snow Melter for Manholes or Sewer Pipes); U.S. Pat. No. 1,253,692 issued January 1918 to Kampff (Thawing Device for Hydrants); U.S. Pat. No. 1,292,941 issued January 1919 to Winters (Means for Thawing out Sewers); U.S. Pat. No. 1,294,888 issued February 1919 to Farrell & Maier (Means for Thawing Frosted Fire Hydrants, Water Mains, and the Like); U.S. Pat. No. 4,770,211 issued September 1988 to Ollson (Method for Thawing Out Road Culverts Choked with Ice). These inventions disclose methods which generally fall within two categories.

One method includes pre-placing thawing pipes within the culvert. Upon freezing of the culvert, high-pressure steam is passed through the thawing pipes. The heat produced by the steam is thermally conducted through the wall of thawing pipe to melt the surrounding ice. Use of these thawing pipes presents various problems. While heating pipes are effective in melting ice directly surrounding the heating pipe, they are ineffective in heating remote portions of the culvert. This is because the temperature profile of the water/ice slurry surrounding the pipe rapidly decreases at a rate roughly proportional to the square of the distance from the pipe. Thus, heating pipes only reestablish small, annular passages therearound. Also, heating pipes must therefore run along the entire length of the culvert to be effective. But providing long culverts with thawing pipes is expensive, and providing multiple culverts under long stretches of highway with more than a small number of culvert thawing pipes quickly becomes cost-prohibitive. Finally, the severe temperature gradients and cyclic temperature changes experienced by the thawing pipe walls encourage crack propagation and lead to breaches therethrough. Once the integrity of the thawing pipe is breached, the steam intended to be passed therethrough, instead escapes into the culvert. When this happens the thawing pipe becomes ineffective in thawing the culvert downstream of the breach.

A second method for re-establishing communication through a culvert entails running a flexible steam tube with a power head into and through the frozen culvert. A power head, or a rat, is a specially-formed nozzle which is attached to the discharge end of a flexible steam tube. The rat has a forward discharge orifice which discharges steam in a forward direction to melt the ice. The rat also has a plurality of rearward discharge orifices which discharge steam at a greater force than the steam exiting forward discharge orifice, thereby propelling the rat forward through the culvert. As the steam leaving a rat is not constrained by a heating pipe, the steam more effectively thaws culvert ice. Because rats are more effective than heating pipes, the rats are more commonly used.

However, rats also have a drawback. Culverts are generally located deep below the ground surface. Culvert openings are commonly accessible by manholes and ladders. Other manholes open into ditches or creeks, at the bottom of embankments. Thus, on those occasions in which the culvert opening needs to be accessed in order to insert the rat, the culvert opening is often covered by numerous feet of ice, snow or ice-water slurry. Under these circumstances, insertion of the rat into the culvert opening is difficult at best, and further, can even be dangerous. First, merely locating the snow-covered culvert opening or manhole can prove difficult and time-consuming. Once the location is determined, accessing the culvert opening is a second, not inconsiderable task. The maintenance personnel must first dig through the snow and then chisel through the ice which is covering the culvert opening. This is strenuous, time-consuming work which must be carried out in sub-freezing temperatures, and often, undertaken in dangerous locations such as at the bottom of steep inclines and near chilling, snow-obscured creeks. Preferably, the rat should not be used for this task because the rat must be operated within a sleeve or pipe to guide the movement of the rat's flexible hose. Otherwise, the hose can whip in an uncontrolled manner and the rat can easily change direction, discharging high-pressure steam at the maintenance workers. Even if the rat is used, significant excess energy must be expended unnecessarily to generate the steam for melting the large body of ice situated above the culvert opening.

Therefore a need still exists for a device which enables easy introduction of a rat into a culvert for thawing ice therein. None of the above inventions and patents, taken either singly or in combination, is seen to describe the instant invention as claimed.

SUMMARY OF THE INVENTION

The present invention is a culvert thawing tube guide which is positioned at the opening of a culvert to enable a maintenance worker to easily introduce a thawing tube with a rat into an ice-covered culvert. The main component of the culvert thawing tube guide is a guide pipe. The guide pipe has a discharge end disposed within the culvert opening and an inlet end disposed in a predetermined position for safe access by a maintenance worker. The guide pipe does not extend along the entire length of the culvert. Rather, the discharge end of the guide pipe need only extend into the culvert far enough to guide the rat into the culvert opening. Thus, the length of piping needed is minimized.

The interior passage of the guide pipe is of a predetermined diameter which is large enough to permit a rat to enter the inlet end, pass through the entire length, and exit the discharge end of the guide pipe. As standard a thawing tubes' rat has a diameter of approximately 1", and the optimal size for the interior diameter of the guide pipe is 3" to 4". Preferably, the guide pipe should not contain any angles greater than 45° to ensure that the rat does not get caught up in the guide pipe. Alternatively, in those applications where the culvert opening is located at the bottom of a deep, narrow access hole, the guide pipe may be bent in a curve having a radius sufficiently large to permit passage of the rat. Another option entails utilizing a guide pipe with an enlarged diameter. The enlarged diameter would provide enough space in the guide pipe passage to allow a rat to maneuver through a 90° pipe angle.

The guide pipe may be constructed of any of a variety of conventional piping materials, such as iron, galvanized or stainless steel, or high-pressure plastic tubing. However, the material chosen for the guide pipe must be able to withstand the high-pressure steam which is discharged from the rat as the thawing tube is passed through. Preferably, the guide pipe should be capable of withstanding a steam pressure of at least 200 psig. Also, because various solvents and salts used to melt road ice migrate to the culverts, the guide pipe should be resistant to corrosion. In this regard, the use of plastic tubing according to the invention will satisfy the aforementioned requirement and be made to withstand the high temperatures and corresponding pressures as defined by Boyle's law. It would be obvious to one of ordinary skill in the relevant art to provide plastic or otherwise tubing according to specific strength requirements given a specific temperature and pressure range. The structural qualities desired in the tubing for a specific temperature and pressure range are modifications which are known in the art and considered to be a mere matter of obvious design choice.

The guide pipe also possesses a plurality of holes bored therethrough. The holes are of a predetermined size which is large enough to permit steam to escape and melting ice to drain from the guide pipe passage. However, the holes must be small enough so as to not interfere with the travel of a culvert thawing tube passing through the guide pipe passage. The holes can be up to $7/16$" in diameter, as the outer diameter of the front of the power head is tapered to $11/16$" in diameter as diagrammatically illustrated in FIG. 3. The presence of the holes prevents the guide pipe from rupturing or cracking when ice freezes in the guide pipe and when the steam tube causes large temperature and pressure changes. It is highly preferable if the discharge end of the guide pipe is disposed along the interior wall of the culvert to minimize the guide pipe's interference with drainage, and in combination, if the holes bored through the discharge end of the guide pipe are disposed on the side of the guide pipe distal from the culvert. This positioning of the discharge end and the holes bored therethrough will direct the discharging steam toward the culvert ice for more efficient melting. More specifically, it is highly preferable if the discharge end is disposed along the top portion of the culvert's interior wall and the guide pipe holes are disposed in the bottom side of the discharge end of the guide pipe. The distance upstream which the holes need to be extended will be dictated by local weather conditions specific to the individual application.

In many applications, ice and snow accumulations may obscure the inlet end of the guide pipe. Thus, it is preferable to provide a locating means to indicate the location of the inlet end. One example of an inexpensive locating means includes reflective tape wrapped around the inlet end. Alternatively, a locating pole may be positioned in close proximity to the inlet end of the guide pipe. Further, the visibility of the locating pole may be enhanced with flags or reflectors.

The guide pipe is securely positioned relative to the culvert by a securing means. The securing means may include various conventional metal fasteners or braces, such as angle irons or metal straps. Preferably, at least one fastener should be employed to secure the discharge end of the guide tube within the culvert, and at least one additional fastener should be employed to secure the inlet end of the guide tube at the predetermined location for safe access by a maintenance person.

Accordingly, it is a principal object of the invention to provide a culvert thawing tube guide in combination with a culvert to guide a thawing tube with a power head into a culvert covered with ice, snow or an ice slurry.

It is another object of the invention to extend the inlet end of the culvert thawing tube guide to a position which can be safely and easily accessed by maintenance personnel.

It is a further object of the invention to provide a culvert thawing tube guide having holes which serve the dual purpose of preventing pipe rupture and simultaneously aid in melting culvert ice.

Still another object of the invention is to provide a culvert thawing tube guide which is easy to locate in inclement weather.

Further still, it is an object of the invention to provide a culvert thawing tube guide having a cap for preventing the accumulation of debris within the tube from the surrounding environment of application.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a culvert thawing tube guide. The major components include the thawing tube guide pipe and securing means for securing the position of the guide pipe relative to the culvert.

Figure 1:
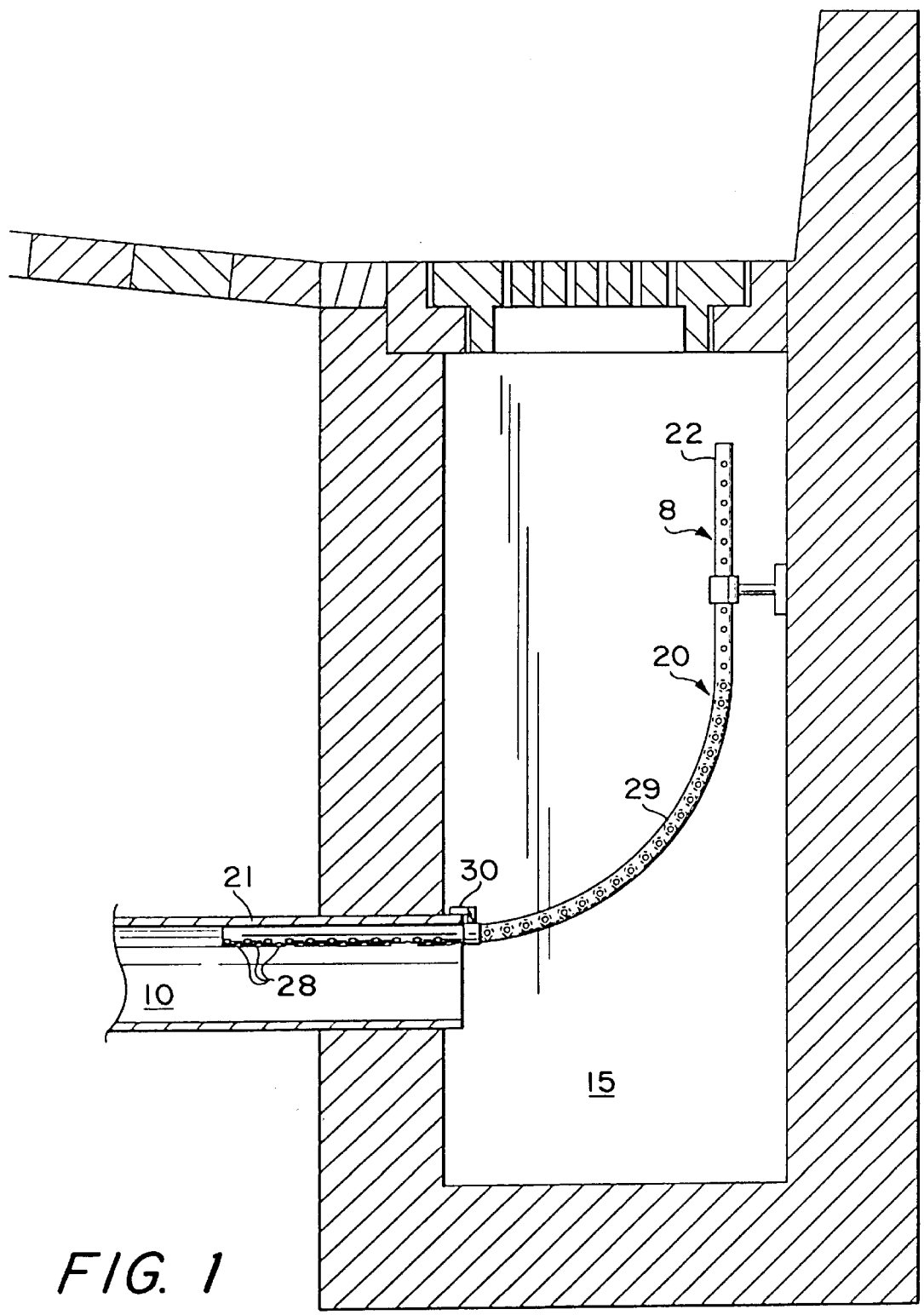
FIG. 1 is an environmental, cross-section schematic illustration of the present invention in combination with a covered culvert opening to a catch basin.

FIG. 1 of the accompanying drawings depicts the thawing tube guide 8 disposed within a culvert 10 which opens into a catch basin 15. The guide pipe 20 of the thawing tube guide 8 has a discharge end 21 disposed within the upper half of the culvert 10, an inlet end 22 disposed in a predetermined location above the culvert 10 within the catch basin 15. The portion of the guide pipe 20 adjacent the discharge end 21 possesses a plurality of holes 28 bored through the lower side the guide pipe 20. The holes 28 are of a predetermined size large enough to permit steam to escape and melting ice to drain from the guide pipe passage, but small enough so as to not interfere with the travel of a culvert thawing tube passing through the guide pipe passage. The holes can be opposing top to bottom or side to side 1½" apart and 7/12" in diameter. The guide pipe 20 has a continuous bend 29 of a predetermined radius sized large enough for passing the culvert thawing tube therethrough. Holes are also disposed along or up the bend 29, preferably opposing each other, 3" on one side and 1½" on the other side. The bottom of tube along the bend 29 have holes 2" apart at the base or facing downward along and up the bend 29 towards a securing means 30 and near the inlet 22 opposing each other from side to side 2" apart. Conventional securing means 30 secure the position of the guide pipe 20 relative to the culvert 10.

Figure 2:
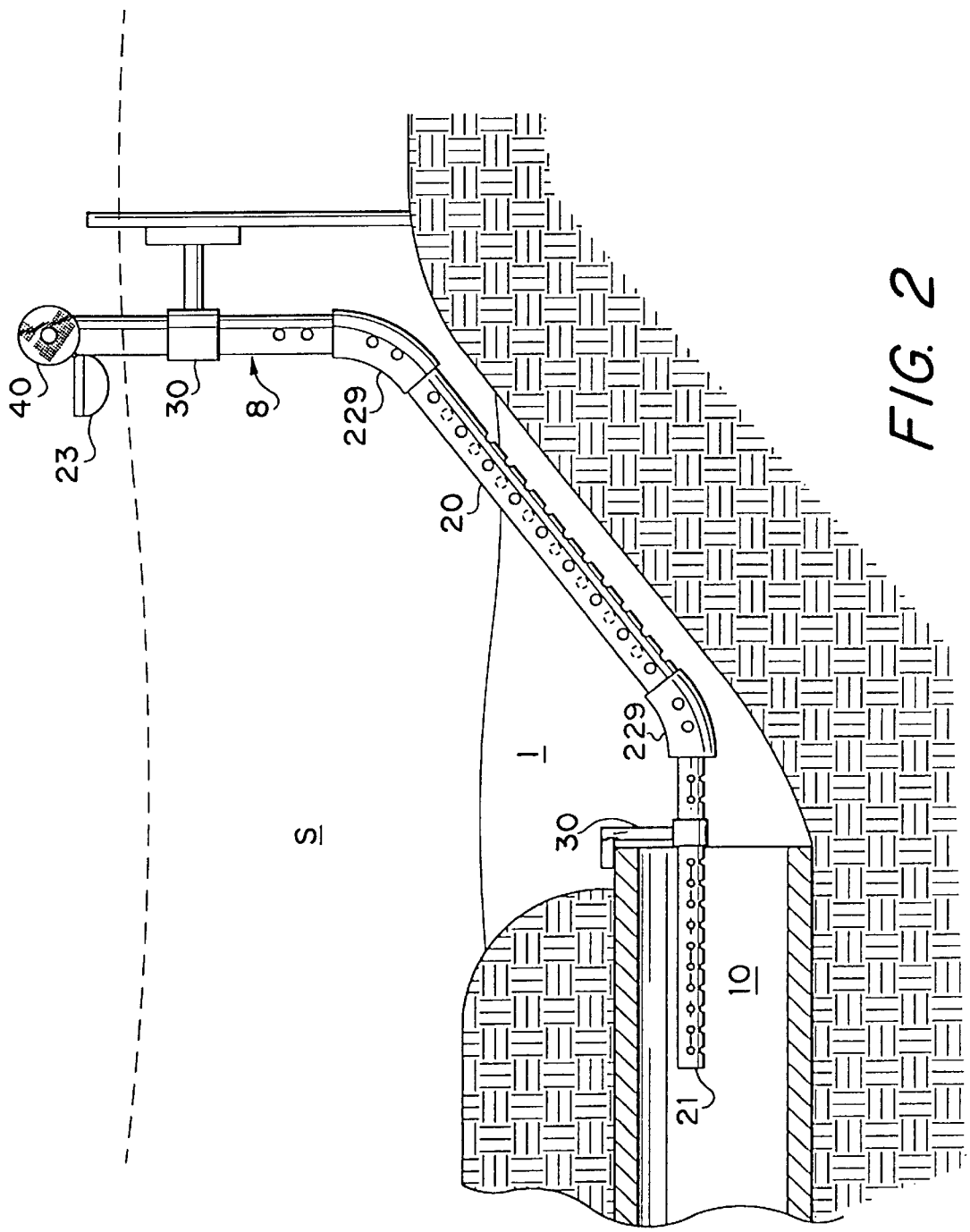
FIG. 2 is an environmental, cross-section schematic illustration of an alternate embodiment of the present invention in combination with a culvert opening to a drainage ditch.

FIG. 2 of the accompanying drawings depicts an alternate embodiment of the thawing tube guide 8 disposed within a culvert 10 which opens into a drainage ditch 115. The guide pipe 20 of the thawing tube guide 8 has a discharge end 21 disposed within the upper half of the culvert 10. The guide pipe 20 extends upward through the ice I which covers drainage ditch 115 and continues upward through the layer 20 of snow S. As diagrammatically illustrated in the figure, holes are made within the bend 229 and along the guide pipe 20. With respect to the bend, holes 1½" apart and opposing each other from side to side are arranged therein.

With respect to the guide pipe 20, the holes are staggered on the side. On one side, the holes are 3" apart, and on the other side the holes are 1½" apart. Holes disposed at the bottom of the guide pipe 20 are 2" apart and terminate near the ice line, and prior to the bend 229 above the ice line. The holes along the sides, however, are disposed continually along the guide pipe 20, and bend 229 which is above the ice line and continues near the securing means 30. The inlet end 22 of the guide pipe 20 is disposed in a predetermined location above the culvert 10 for easy access by maintenance personnel. A reflector 40 is positioned at the inlet end 22 to provide means for locating the inlet end 22 of the guide pipe 20. The guide pipe 20 has two 45°-angled bends 229 to enable unobstructed passage of a culvert thawing tube through the guide pipe 20. Conventional securing means 30 secure the position of the guide pipe 20 relative to the culvert 10. A hinged cap 23 is optionally placed over the inlet end 22 of the thawing tube guide 8 to prevent debris from wooded or similar areas (eg. leaves, branches, etc.) from entering or accumulating within the guide pipe 20. In the event that the thawing tube 8 is not open to a wooded or similar environment, the cap 23 is left opened on its hinge.

Figure 3:
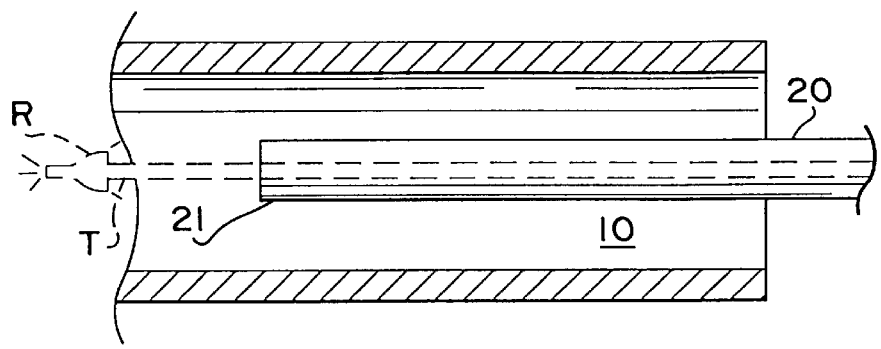
FIG. 3 is a top view of a thawing tube passed through the discharge end of the guide pipe which is disposed within a culvert.

FIG. 3 is a top view of the discharge end 21 of the guide pipe 20 disposed within a culvert 10. A culvert thawing tube T having a rat R attached at the end thereof is depicted in phantom line extending out of the discharge end 21. The rat R discharges high-pressure steam in a forward direction to thaw ice present in culvert 10. The rat R also discharges high-pressure steam in a rearward direction to propel the rat in a forward direction. The hose or tube T is banded to the rat R or power head with the preferred use of stainless steel bands via banding pliers. While codes for the type of rats used vary in various municipalities, any design other than the flat head and flange designs can be made by the skilled artisan to provide the same effect of the rat R according to the invention as herein disclosed. Since, the shape or geometry of the rat R is a matter of intended use, it would be obvious to one of ordinary skill in the art to design the rat in any desired shape or contour to fulfill the desired need. The inserted end of the guide pipe 20 can be a flange (not shown) to prevent the power head from snagging when retrieving the thawing tube 8 after the culvert 10 has been de-iced.

Figure 4:
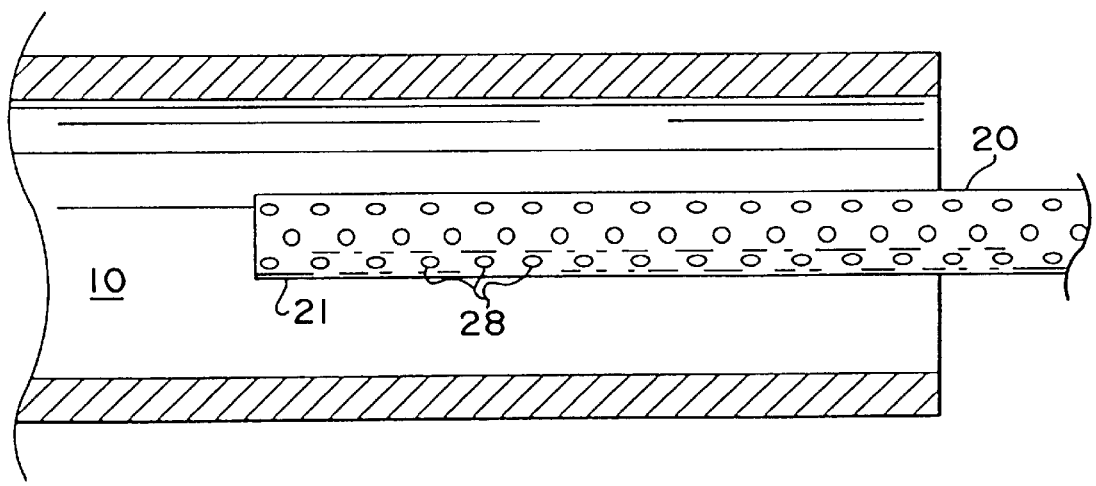
FIG. 4 is bottom view of the bored discharge end of the guide pipe disposed within a culvert.

FIG. 4 is a bottom view of the discharge end 21 of the guide pipe 20 disposed within a culvert 10. Together, FIG. 3 and FIG. 4 depict that the holes 28 are bored through only the lower portion of the guide pipe 20.

It is to be understood that the present invention is not limited to the embodiments described above, but encompasses any and all embodiments within the scope of the following claims.

I claim:

1. A culvert thawing guide for guiding a power head, and a flexible steam supply tube supplying the power head into a culvert, the power head and the flexible steam supply tube being useful for restoring fluid communication through a culvert choked with ice, the power head having at least one orifice for allowing steam to issue therefrom, the culvert having an entrance, an interior, a length, and a longitudinal axis, the culvert thawing guide comprising:

a guide pipe having an inlet end and an outlet end, the guide pipe having a diameter large enough to allow the power head and the flexible steam supply tube to pass therethrough, said outlet end of said guide pipe and a portion of said guide pipe adjacent said outlet being positioned within the interior of the culvert proximate the entrance to the culvert, said portion of said guide pipe adjacent said outlet and being positioned within the interior of the culvert extending in a direction which is substantially parallel to the longitudinal axis of the culvert, said guide pipe having at least one bend such that said inlet end of said guide pipe is in an elevated position vertically above said outlet end of said guide pipe and said portion of said guide pipe adjacent said outlet and being positioned within the interior of the culvert, said at least one bend having a radius of curvature which is sufficiently large to allow the power head to pass therethrough without the power head being caught in said bend;

a first securing means attached to said guide pipe proximate said portion of said guide pipe adjacent said outlet and being positioned within the interior of the culvert, said first securing means fixing said outlet end of said guide pipe and said portion of said guide pipe adjacent said outlet and being positioned within the interior of the culvert, in place relative to the culvert; and a second securing means attached to said guide pipe, said second securing means fixing said inlet end of said guide pipe in said elevated position, whereby, when the culvert is obstructed by one of snow, ice, and a combination thereof, the power head and the flexible steam supply tube can be passed through said guide pipe in order to guide the power head and the flexible steam supply tube into the interior of the culvert to thereby restore fluid communication through the culvert.

2. The culvert thawing guide according to claim 1, wherein said guide pipe is constructed of a material capable of withstanding steam at a pressure of at least 200 psig.

3. The culvert thawing guide according to claim 1, wherein said guide pipe is constructed from a material selected from a group consisting of iron, stainless steel and high-pressure plastic tubing.

4. The culvert thawing guide according to claim 1, wherein the culvert interior has an upper half and said outlet end of said guide pipe is disposed within the upper half of the culvert interior, and said guide pipe further includes a perforated portion adjacent said outlet end and extending along said guide pipe, said perforated portion having a plurality of holes, each of said plurality of holes being of a predetermined size large enough to permit steam to escape and melting ice to drain from said guide pipe, but small enough so as to not interfere with the power head, as the power head passes through said guide pipe.

5. The culvert thawing guide according to claim 1, further comprising locating means for indicating the location of said inlet end of said guide pipe.

6. The culvert thawing guide according to claim 5, wherein said locating means comprises reflective tape wrapped around said guide pipe adjacent said inlet end of said guide pipe.

7. The culvert thawing guide according to claim 5, wherein said locating means comprises a locating pole positioned in close proximity to said inlet end of said guide pipe, said locating pole having a predetermined length sufficient to extend above a predetermined height of snow covering the entrance to the culvert.

8. The culvert thawing guide according to claim 1, further comprising a cap provided at said inlet end of said guide pipe for preventing debris from accumulating within said guide pipe.

9. The culvert thawing guide according to claim 8, wherein said cap is hingedly connected to said inlet end of said guide pipe.

* * * * *